(12) United States Patent
Flosbach et al.

(10) Patent No.: US 8,907,007 B2
(45) Date of Patent: Dec. 9, 2014

(54) PROCESS FOR PAINTING SUBSTRATES

(75) Inventors: Carmen Flosbach, Wuppertal (DE); Andrew Hearley, Wuppertal (DE); Wiebke Becker, Essen (DE); Juergen Peter Stropp, Altendorf (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 609 days.

(21) Appl. No.: 12/738,339

(22) PCT Filed: Oct. 1, 2008

(86) PCT No.: PCT/US2008/078416
§ 371 (c)(1),
(2), (4) Date: Jul. 7, 2010

(87) PCT Pub. No.: WO2009/051962
PCT Pub. Date: Apr. 23, 2009

(65) Prior Publication Data
US 2010/0279016 A1 Nov. 4, 2010

Related U.S. Application Data

(60) Provisional application No. 60/999,624, filed on Oct. 19, 2007.

(51) Int. Cl.
*C08L 75/00* (2006.01)
*C08L 33/06* (2006.01)
*C08G 18/28* (2006.01)
*C09D 175/04* (2006.01)

(52) U.S. Cl.
CPC ............ *C08G 18/282* (2013.01); *C09D 175/04* (2013.01)
USPC ............ 524/589; 524/560; 524/590; 524/591

(58) Field of Classification Search
USPC .................. 427/372; 524/560, 589, 590, 591
See application file for complete search history.

(56) References Cited

U.S. PATENT DOCUMENTS

| | | |
|---|---|---|
| 4,489,135 A | 12/1984 | Drexel et al. |
| 5,141,987 A | 8/1992 | Nachtkamp et al. |
| 5,492,961 A | 2/1996 | Brock et al. |
| 5,556,912 A | 9/1996 | Brock et al. |
| 5,596,043 A | 1/1997 | Harris et al. |
| 5,635,559 A | 6/1997 | Brock et al. |
| 5,691,425 A | 11/1997 | Klein et al. |
| 5,741,849 A * | 4/1998 | Blum et al. ............. 524/591 |
| 5,854,337 A | 12/1998 | Wandelmaier et al. |
| 6,309,707 B1 * | 10/2001 | Mayer et al. ............. 427/386 |
| 2002/0103293 A1 * | 8/2002 | Ambrose et al. ............. 525/7 |
| 2006/0155021 A1 * | 7/2006 | Lenges et al. ............. 524/211 |
| 2006/0155149 A1 * | 7/2006 | Lenges et al. ............. 564/503 |

FOREIGN PATENT DOCUMENTS

| | | |
|---|---|---|
| DE | 4115042 A1 | 12/1992 |
| DE | 4228510 A1 | 3/1994 |
| DE | 10128885 A1 | 2/2003 |
| EP | 0562282 A1 | 9/1993 |
| EP | 0915113 B1 | 12/1999 |
| WO | 8501733 A1 | 4/1985 |
| WO | WO 02/50199 A2 | 6/2002 |
| WO | WO 2006/026671 A1 | 3/2006 |

OTHER PUBLICATIONS

ISA EPO, International Search Report and Written Opinion for International Application No. PCT/US2008/078416, dated Dec. 30, 2008.
ISA EPO, International Preliminary Report on Patentability for International Application No. PCT/US2008/078416, dated Apr. 20, 2010.

* cited by examiner

*Primary Examiner* — Aiqun Li
(74) *Attorney, Agent, or Firm* — Ingrassia Fisher & Lorenz, P.C.

(57) ABSTRACT

The invention relates to a process for painting substrates comprising the following steps:
1. applying a coating composition to an optionally pre-coated substrate and
2. hardening the applied coating composition, wherein the coating composition comprises:
A) at least one binder having functional groups containing active hydrogen,
B) at least one polyisocyanate cross-linking agent having free isocyanate groups and
C) at least one urethane compound having at least two —O—CO—NH— groups, wherein the urethane compound is substantially free from functional groups which are capable of entering into a cross-linking reaction with components A) and/or B) and wherein the hardening is carried out under conditions such that the component C) does not contribute to the cross-linking of the applied coating composition by chemical reaction.

15 Claims, No Drawings

PROCESS FOR PAINTING SUBSTRATES

FIELD OF THE INVENTION

The invention relates to a process for painting substrates with isocyanate-curing two-component coating compositions which can be used, in particular, in vehicle refinishing painting.

DESCRIPTION OF RELATED ART

The use of amino resins for the thermal crosslinking of compounds containing secondary and/or primary carbamate groups is sufficiently well known.

EP 915 113 thus describes clear or top coats for the painting of motor vehicles containing a) compounds having carbamate groups and hydroxyl groups or compounds having carbamate groups and separate compounds having hydroxyl groups, b) polyisocyanates having free or blocked isocyanate groups and c) amino resins. These coating compositions can be crosslinked at 70 to 180° C., preferably at 120 to 150° C. The amino resins react first with the carbamates and then with the hydroxyl groups. The purpose of the coating compositions is to ensure good rheology control on application and crosslinking.

Furthermore, WO 02/501 199 describes carbamate-functional acrylic copolymers comprising epsilon-caprolactone units which are in the beta-position to the carbamate group. These carbamate-functional acrylic copolymers can be used in refinishing and OEM clear coats. They are highly suitable for formulating corresponding high solids paints. The crosslinking agents used in these coating compositions may be amino resins, anhydride-functional compounds and phenol formaldehyde adducts. Furthermore, DE 101 28 885 describes the use of blocked or unblocked polyisocyanates for the thermal crosslinking of compounds containing carbamate groups. The crosslinking is carried out in this case by reacting the isocyanate groups with the carbamate groups. Optionally, components having hydroxyl groups and/or amino groups can additionally be contained in the system.

Two-component isocyanate-curing paints for vehicle refinishing painting have to have a high physical drying rate and, on the other hand, the paint film should be free from surface defects, such as popping marks, and be high gloss. A high run limit is also required. In two-component water-based paints, reaction bubbles caused by the reaction of isocyanate with water also have to be avoided. To achieve good physical drying, it is already known to use acrylate resins of high molecular weight and having a high glass transition temperature (Tg). However, the use of these acrylate resins leads to low solids contents in the paint. Moreover, on use in water-based paints, a lower popping limit is observed, i.e. flaws such as popping marks are produced even at a relatively low film layer thickness of about 40 μm. Furthermore, a narrow application window is required (in particular, a narrow range of the relative humidity during application) in order to obtain acceptable painting results.

The object of the present invention was to provide a process for painting substrates which allows to apply isocyanate-curing two-component coating compositions and to achieve coatings with rapid physical drying and to produce high-gloss paint films which have a good visual appearance, i.e. are free from defects, even if applied at relatively high coating thicknesses of, for example, 60 to 70 μm. The process should also lead to coatings which display good adhesion to the substrate and good resistance to stone ship and be readily usable, in particular, for vehicle painting and vehicle refinishing painting. When applying aqueous isocyanate-curing two-component coating compositions, the coatings should not display any visual defects caused by the production of reaction bubbles resulting from the reaction of isocyanate and water. The present invention relates to a process for painting substrates comprising the following steps:

1. Applying a coating composition to an optionally pre-coated substrate and
2. Hardening the applied coating composition, wherein the coating composition comprises:

A) at least one binder having functional groups containing active hydrogen,
B) at least one polyisocyanate crosslinking agent having free isocyanate groups and
C) at least one urethane compound having at least two —O—CO—NH— groups, wherein the urethane compound is substantially free from functional groups which are capable of entering into a crosslinking reaction with components A) and/or B). The hardening is carried out under conditions such that the component C) does not contribute to the crosslinking of the applied coating composition by chemical reaction.

Preferably, the applied coating composition is hardened at temperatures from room temperature to 80° C. The coating composition is crosslinked by chemical reaction between the functional groups comprising active hydrogen of component A) and the free isocyanate groups of component B).

The term "room temperature" refers in this case to the ambient temperature at which the coating composition is applied. The temperatures are therefore for example from 18 to 25° C.

DETAILED DESCRIPTION OF THE EMBODIMENTS

It will be appreciated that certain features of the invention which are, for clarity, described above and below in the context of separate embodiments may also be provided in combination in a single embodiment. Conversely, various features of the invention that are, for brevity, described in the context of a single embodiment may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about". Thus, slight variations above and below the stated ranges can be used to achieve substantially the same results as values within the ranges. Moreover, in the disclosure of these ranges, a continuous range is intended, covering every value between the minimum and maximum values, including the minimum and maximum end points of the range.

The term (meth)acrylic as used here and hereinafter should be taken to mean methacrylic and/or acrylic.

Unless stated otherwise, all molecular weights (both number average molecular weight Mn and weight average molecular weight Mw) referred to herein are determined by GPC (gel permeation chromatographie) using polystyrene as the standard.

First if all the coating compositions to be used in the process of the present invention shall be explained in more detail.
The coating compositions comprise the components A), B) and C).

The coating compositions preferably comprise 2-20% by weight solids and most preferred 5-20% by weight solids of the at least one urethane compound C), relative to the entire coating composition.

Usually the coating composition comprises 40-80% by weight solids, preferably 50-70% by weight solids of the at least one binder A) and 20-40% by weight solids, preferably 20-30% by weight solids of the at least one curing agent B), relative to the entire coating composition.

Preferably, the content of urethane compound C) in the coating composition should be based on the amount of the binder component A). Preferred coating compositions can thus contain from 3 to 25% by weight, particularly preferably 5 to 20% by weight of urethane compound C) (solid) based on the amount of binder A) (solid). Greater amounts of urethane compound C) can impair the adhesion and resistance of stone ship of the resultant coatings.

Component A) of the coating composition comprises water-dilutable binders with functional groups containing active hydrogen. The water-dilutable binders are oligomeric and/or polymeric compounds with a number average molecular weight (Mn) of, e.g., 500 to 500,000 g/mole, preferably of 1100 to 300,000 g/mole. The functional groups with active hydrogen in particular comprise hydroxyl groups, primary and/or secondary amino groups. Binders with hydroxyl groups are preferably used as component A).

The binders with hydroxyl groups are for example the polyurethanes, (meth)acrylic copolymers, polyesters and polyethers, known from polyurethane chemistry to the skilled person, which are used in the formulation of organic solvent based or aqueous coating compositions. They may each be used individually or in combination with one another.

In order to ensure sufficient water dilutability of the binders A) in case of aqueous coating compositions, these binders are modified in a suitable manner to render them hydrophilic. The binders A) may be ionically (anionically and/or cationically) and/or non-ionically modified. An anionic modification and an anionic modification in combination with a non-ionic modification is preferred. An anionic modification may be obtained, for example, by incorporating carboxyl groups which are at least partially neutralized. A non-ionic modification may be obtained, for example, by incorporating polyethylene oxide units. Alternatively, or in addition thereto, it is possible to obtain water-dilutability via external emulsifiers.

Preferably, water-dilutable binders A) may contain carboxylic acid groups, sulfonic and/or phosphonic acid groups. Carboxylic acid groups are most preferred.

Examples of binders A) are polyurethane resins, for example, with a number average molecular weight Mn of 500 to 500 000 g/mol, preferably, of 1100 to 300 000 g/mol, most preferably, of 5000 to 300 000 g/mol, an acid value of 0 to 100 mg KOH/g, preferably of 20 to 80 mg KOH/g, and a hydroxyl value of 40 to 400 mg KOH/g, preferably, of 80 to 250 mg KOH/g. Appropriate polyurethane resins which may be used are, for example, prepared by reacting compounds which are reactive with respect to isocyanate groups and polyisocyanates having at least 2 free isocyanate groups per molecule.

Polyols of high molecular weight can be used as compounds which are reactive with respect to isocyanate groups, preferably, polyester polyols, polyether polyols and/or polycarbonate polyols with a molecular weight of, for example, 500-6000 g/mol. Polyols of low molecular weight with a molecular weight of 60-400 g/mol can also be co-used. Aliphatic and/or cycloaliphatic diisocyanates can preferably be used as polyisocyanates. Examples of useful polyisocyanates are phenylene diisocyanate, xylylene diisocyanate, diphenylmethane diisocyanate, isophorone diisocyanate, dicyclohexylmethane diisocyanate, tetramethylene diisocyanate, hexamethylene diisocyanate. In order to obtain a sufficient water-dilutability, the polyurethane resins can be modified, for example, with anionic groups as described above. The anionic groups can be introduced by way of compounds having at least one group reactive with respect to isocyanate groups and at least one group capable of producing anions. Preferred compounds of this type are dihydroxycarboxylic acids, with particular preference for dimethylolpropionic acid.

The thus obtained polyurethane resins can still be subjected to chain extension to increase the molecular weight. For example, NCO-functional polyurethane prepolymers can be reacted with compounds, which are reactive with respect to isocyanate groups. Compounds, which are reactive with respect to isocyanate groups, are in particular compounds with hydroxyl and/or secondary and/or primary amino groups. OH-functional polyurethane prepolymers can be chain extended for example with polyisocyanates The polyurethane resins include such resins which are in modified form, for example, as silicon-modified or (meth)acrylated polyurethane resins. Examples of polyurethane resins which may be used are described in U.S. Pat. No. 5,492,961, U.S. Pat. No. 5,141,987, U.S. Pat. No. 5,556,912, DE-A-41 15 042, U.S. Pat. No. 5,635,559, U.S. Pat. No. 5,691,425, DE-A-42 28 510, U.S. Pat. No. 5,854,337 and U.S. Pat. No. 4,489,135. Water-dilutable polyurethanes can be prepared in the organic phase and converted afterwards into the aqueous phase, but can also be prepared directly in the aqueous phase to form polyurethane emulsions. Those polyurethane emulsions may be crosslinked internally and can be defined as microgels.

Examples of poly(meth)acrylate resins include all poly (meth)acrylate resins which are suited for solvent based or aqueous coatings and known to a skilled person. For example, they can be those with a number average molecular mass Mn of 1000-20000 g/mol, preferably, of 1100-15000, an acid value of 0-100 mg KOH/g, preferably, of 15-50 and a hydroxyl value of 40-400 mg KOH/g, preferably, of 60-200 mg KOH/g. The water-dilutable poly(meth)acrylate resins can also have been prepared in the presence of different binders, e.g., in the presence of oligomeric or polymeric polyester and/or polyurethane resins.

The poly(meth)acrylate copolymer can be prepared by free-radical polymerization of polymerizable, olefinically unsaturated monomers, optionally, in presence of oligomeric or polymeric polyester and/or polyurethane resins. Free-radically polymerizable, olefinically unsaturated monomers, which may be used are monomers which, in addition to at least one olefinic double bond, also contain further functional groups and monomers which, apart from at least one olefinic double bond, contain no further functional groups. Further functional groups may be, for example, urea, hydroxyl, carboxyl, sulfonic acid, silane, amine, amide, acetoacetate or epoxy groups. It would be clear that only those functional groups can be combined in the poly(meth)acrylate copolymer which do not tend to self-crosslink.

Olefinically unsaturated monomers with hydroxyl groups are used to introduce hydroxyl groups into the (meth)acrylic copolymers. Suitable hydroxy-functional unsaturated monomers are, for example, hydroxyalkyl esters of alpha, beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. The hydroxyalkyl esters of (meth)acrylic acid are preferred. The hydroxyalkyl residues may contain, for example, 2-10 C atoms, preferably, 2-6 C atoms. Examples of suitable hydroxyalkyl esters of alpha, beta-olefinically unsaturated monocarboxylic acids with primary hydroxyl groups are hydroxyethyl (meth)acrylate, hydroxypropyl (meth)acrylate, hydroxybutyl (meth) acrylate, hydroxyamyl (meth)acrylate, hydroxyhexyl (meth) acrylate. Examples of suitable hydroxyalkyl esters with secondary hydroxyl groups are 2-hydroxypropyl (meth)acrylate, 2-hydroxybutyl (meth)acrylate and 3-hydroxybutyl (meth)acrylate. Further olefinically unsaturated monomers with hydroxy groups may, of course, also be used.

Carboxyl functional olefinically unsaturated monomers are used to introduce carboxyl groups into the (meth)acrylic copolymers. Examples of suitable olefinically unsaturated carboxylic acids include acrylic acid, methacrylic acid, crotonic acid and isocrotonic acid, itaconic acid, maleic acid, fumaric acid and the halfesters of the difunctional acids. Acrylic and methacrylic acid are preferred.

Examples of other additional suitable unsaturated monomers, which contain apart from an olefinic double bond further functional groups are ethyleneurea ethyl (meth)acrylate, dimethylaminoethyl (meth)acrylate, acetoacetoxyethyl (meth)acrylate, (meth)acrylamide, alkoxy methyl (meth) acrylamides, vinyl silane, methacryloxyethyl trialkoxysilanes, acrylamido 2-methyl propane, vinyl imidazole.

Unsaturated monomers which, apart from at least one olefinic double bond, contain no further functional groups are, for example, aliphatic esters of olefinically unsaturated carboxylic acids, vinyl ester and/or vinylaromatic hydrocarbons.

Examples of suitable aliphatic esters of olefinically unsaturated carboxylic acids include, in particular, esters of alpha, beta-olefinically unsaturated monocarboxylic acids with aliphatic alcohols. Examples of suitable olefinically unsaturated carboxylic acids are acrylic acid, methacrylic acid, crotonic acid and isocrotonic acid. The alcohols are, in particular, aliphatic monohydric branched or unbranched alcohols having 1-20 carbon atoms in the molecule. Examples of (meth) acrylates with aliphatic alcohols are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates.

Examples of suitable vinyl esters are vinyl acetate, vinyl propionate and vinyl esters of saturated monocarboxylic acids branched in the alpha position, e.g., vinyl esters of saturated alpha,alpha'-dialkylalkane monocarboxylic acids and vinyl esters of saturated alpha-alkylalkane monocarboxylic acids having in each case 5-13 carbon atoms, preferably, 9-11 carbon atoms in the molecule.

Examples of vinylaromatic hydrocarbons preferably are those having 8-12 carbon atoms in the molecule. Examples of such monomers are styrene, alpha-methylstyrene, chlorostyrenes, vinyltoluenes, 2,5-dimethylstyrene, p-methoxystyrene and tertiary-butylstyrene.

The preparation of the (meth)acrylic copolymer takes place by usual preparation techniques, e.g., by radical polymerization in the organic phase as one- or two-stage process. After solution polymerization the copolymer may be converted into the aqueous phase. But (meth)acrylic copolymers can also be prepared by radical emulsion polymerization in the aqueous phase to form aqueous (meth)acrylic emulsions. Those (meth)acrylic emulsions may be crosslinked internally.

Examples of polyester resins which can be used as binder component A) include all polyester resins which are suited for organic solvent based or aqueous coatings, for example, hydroxyfunctional polyesters with a number average molecular weight of 500-10,000 g/mol, preferably, of 1100-8000 g/mol, an acid value of 0-150 mg KOH/g, preferably, of 15-50 mg KOH/g and a hydroxyl value of 40-400 mg KOH/g, preferably, of 50-200 g/mol. The polyesters may be saturated or unsaturated and they may optionally be modified with fatty acids. The polyesters are produced using known processes with elimination of water from polycarboxylic acids and polyalcohols.

The coating compositions can also contain low molecular reactive components, so-called reactive thinners, which are able to react with the polyisocyanate cross-linking agent B). Examples of these are hydroxy- or amino-functional reactive thinners.

Especially preferred hydroxyfunctional (meth)acrylic copolymers are used as binder component A). However, the hydroxyfunctional (meth)acrylic copolymers may also be used in combination with other hydroxyfunctional polymers, for example with those described above.

In case of aqueous coating compositions preferably water-dilutable hydroxyfunctional and acid-functional (meth) acrylic copolymers are used as binder component A). The preparation of these water-dilutable (meth)acrylic copolymers takes place by usual preparation techniques, e.g., by radical polymerization in the organic phase as one- or two-stage process and subsequent conversion into the aqueous phase.

In particular water-dilutable hydroxyfunctional and acid-functional (meth)acrylic copolymers are used comprising
a) 10-80% by weight, preferably 20-60% by weight, of a reaction product of a monoepoxyester and an unsaturated acid functional monomer
b) 0-40% by weight, preferably 10-30% by weight, of a hydroxy functional unsaturated monomer which is different from component a),
c) 1-8% by weight, preferably 2-6% by weight, of an unsaturated acid functional monomer and
d) 0-70% by weight, preferably 20-50% by weight, of other polymerisable unsaturated monomers, wherein the % by weight of components A) and B) and of components a) to d) is adding up to 100% by weight and wherein the (meth)acrylate copolymer is prepared by a skew feed polymerization process with at least two feed streams.

Most preferred one feed stream comprises
I) 60-100% by weight of the reaction product of a monoepoxyester and an unsaturated acid functional monomer a), based on the total amount of component a) in the copolymer,
II) 0-60% by weight of the hydroxy functional unsaturated monomer b), based on the total amount of monomer b) in the copolymer,
III) 0-30% by weight of the unsaturated acid functional monomer c) based on the total amount of monomer c) in the copolymer, and
IV) 0-80% by weight of the other polymerisable unsaturated monomers d), based on the total amount of monomers d) in the copolymer, and wherein the remaining one or more feed streams comprise the balance of components a) to d).

Those (meth)acrylic copolymers have for example a number average molecular weight of 1500 to 6000, a hydroxyl number of 60 to 150 mg KOH/g resins solid and an acid number of 5 to 35 mg KOH/g resins solid and are disclosed for example in WO 2006/026671.

The coating compositions contain polyisocyanates with free isocyanate groups (component B) as cross-linking agents. Examples of the polyisocyanates are any number of organic polyisocyanates with aliphatically, cycloaliphatically, araliphatically and/or aromatically bound free isocyanate groups. The polyisocyanates are liquid at room temperature or become liquid through the addition of organic solvents. At 23° C., the polyisocyanates generally have a viscosity of 1 to 6,000 mPas, preferably, above 5 and below 3,000 mPas.

The preferred polyisocyanates are polyisocyanates or polyisocyanate mixtures with exclusively aliphatically and/or cycloaliphatically bound isocyanate groups with an average NCO functionality of 1.5 to 5, preferably 2 to 4.

Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (isophorone diisocyanate, IPDI) and/or bis(isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than 0.5% by weight. Triisocyanates, such as, triisocyanatononan can also be used.

Sterically hindered polyisocyanates are also suitable. Examples of these are 1,1,6,6-tetramethyl-hexamethylene diisocyanate, 1,5-dibutyl-penta-methyldiisocyanate, p- or m-tetramethylxylylene diisocyanate and the appropriate hydrated homologues.

In principle, diisocyanates can be converted by the usual method to higher functional compounds, for example, by trimerization or by reaction with water or polyols, such as, for example, trimethylolpropane or glycerine. The polyisocyanates can also be used in the form of isocyanate-modified resins.

The polyisocyanate cross-linking agents can be used individually or mixed.

The polyisocyanate cross-linking agents are those commonly used in the paint industry, and are described in detail in the literature and are also obtainable commercially.

Preferably the coating composition is free of melamine resins and/or blocked polyisocyanates.

The at least one urethane compound C) is a compound which does not participate in the crosslinking reaction of the two-component coating composition, i.e. which enters into a chemical crosslinking reaction neither with the component A) nor with the component B) under the hardening conditions employed. The urethane compounds C) are therefore substantially free from functional groups which are capable of entering into a crosslinking reaction with the components A) and/or B). They are, in particular, free from isocyanate, hydroxyl and amino groups. The term "substantially free" means that there may, for example as a result of the preparation process, be provided a very small amount of the aforementioned functional groups, wherein these functional groups as a whole make almost no contribution to the crosslinking of the coating composition. The urethane compounds C) have a number-average molecular mass of from 400 to 5,000, preferably of 600 to 3,000. The urethane compounds C) may be compounds of low molecular weight defined by total and structural formulae and also compounds of higher molecular weight that may display a molar mass distribution.

Preferred urethane compounds C) are products of the reaction of polyisocyanate compounds with monohydroxy compounds. The polyisocyanate compounds may be difunctional or multifunctional isocyanates or isocyanate-functional prepolymers.

The monohydroxy compounds used may be in the form of compounds which are of low molecular weight and defined by empirical and structural formula and monohydroxy compounds which are of higher molecular weight and can display a molecular mass distribution (polymers and/or oligomers).

The polyisocyanate compounds and the monohydroxy compounds can each be used alone or in a mixture.

Examples of polyisocyanates which can be used for preparing the urethane compounds C) include diisocyanates such as, for example, hexamethylene diisocyanate, tetramethylxylylene diisocyanate, isophorone diisocyanate, dicyclohexylmethane diisocyanate, cyclohexane diisocyanate, toluoylene diisocyanate and diphenylmethane diisocyanate.

Further examples of polyisocyanate compounds include polyisocyanates containing heteroatoms in the radical linking the isocyanate groups. Examples include polyisocyanates, carbodiimide groups, allophanate groups, isocyanurate groups, urethane groups, acylated urea groups or biuret groups.

The polyisocyanates which can be used for preparing the urethane compounds C) have an isocyanate functionality of 2 or greater than 2. Said polyisocyanates can be obtained, for example, by dimerisation and/or trimerisation of the above-mentioned diisocyanates to form compounds containing uretdione or isocyanurate groups. Further examples include polyisocyanates which contain biuret groups and are prepared by reacting the aforementioned free diisocyanates with water. Polyisocyanates which have free isocyanate groups and are highly suitable for preparing the urethane compounds C) include, for example, the polyisocyanate crosslinking agents, known for isocyanate-curing paint formulations, based on hexamethylene diisocyanate, isophorone diisocyanate and/or dicyclohexylmethane diisocyanate. The derivatives of these diisocyanates that are known per se and have biuret, allophanate, urethane, uretdione and/or isocyanurate groups are also readily usable. These compounds are known to a person skilled in the art and also commercially available.

It is also possible to use isocyanate-functional prepolymers obtained, for example, by reacting the above-described diisocyanates and polyisocyanates with deficient diols or polyols.

Most preferred polyisocyanates are hexamethylene diisocyanate (HDI) and isophorone diisocyanate (IPDI), in particular the isocyanurates of HDI and IPDI. They can also be used in combination with each other.

Examples of monohydroxy compounds which have low molecular weight, are defined by total and structural formulae and can be used for preparing the urethane compounds C) include (cyclo)aliphatic monoalcohols containing 1 to 22 carbon atoms in the alkyl part. They can, for example, have molar masses ranging from 46 to 600. Examples include ethanol, the isomeric propanols, butanols, pentanols, hexanols, heptanols, octanols, nonanols, decanols and dodecanols and also the higher fatty alcohols containing up to 22 carbon atoms in the alkyl part. Further examples include hydroxymethyl furan, hydroxymethyl tetrahydrofuran, cyclopentanol, benzyl alcohol and cyclohexanol. Examples of monohydroxy compounds of relatively high molecular weight include monohydroxyfunctional polymers such as polyether alcohols, for example having a number-average molecular mass of 200 to 2,000. Those polyether alcohols can be prepared, for example, by ethoxylation or propoxylation of monoalcohols. Example of polyether alcohols are fatty alcohol ethoxylates, fatty alcohol propoxylates, alkyl ethoxylates and alkyl propoxylates.

The most preferred monoalcohol is cyclohexanol.

The urethane compounds C) according to the invention can contain a small number of carboxyl functions. A small portion of the monoalcohols can therefore be exchanged for hydroxycarboxylic acids during the synthesis. Examples of hydroxyl carboxylic acids include malic acid, 12-hdyroxystearic acid or adducts of monoepoxides and dicarboxylic acids. It is also possible to exchange a portion of the monoalcohols for diols and then to react the resulting hydroxyl groups with acid anhydrides to form acid semiesters. Examples of acid anhydrides include maleic anhydride, succinic anhydride, tetrahydrophthalic anhydride, hexahydrophthalic anhydride, methylhexahydrophthalic anhydride, trimellitic anhydride, pyromellitic anhydride. Examples of suitable diols include 1,2-ethylene glycol, the isomeric propan diols, butan diols and pentan diols, neopentyl glycol, the isomeric hexan diols, heptan diols and octan diols.

Particularly preferred urethane compounds C) are those prepared from hexamethylene diisocyanate (HDI) and/or isophorone diisocyante (IPDI), in particular the isocyanurates of HDI and/or IPDI, and cyclohexanol.

The urethane compounds C) which are to be used in accordance with the invention can have an acid number from 0 to 50 mg KOH/g of solid resin. If the urethane compounds C) are to have an acid number, then it is preferably at 5 to 50 mg KOH/g, particularly preferably at 5 to 35 mg KOH/g of solid resin.

Preferred coating compositions according to the invention comprise
A) at least one water-dilutable hydroxyfunctional (meth) acrylic copolymer, preferably a water-dilutable (meth)acrylic copolymer having a number-average molecular mass (Mn) of from 1,500 to 6,000, a hydroxyl number of from 50 to 150 mg KOH/g of solid resin and an acid number of from 5 to 35 mg KOH/g of solid resin,
B) at least one polyisocyanate crosslinking agent having free isocyanate groups and
C) at least one above-defined urethane compound C).

Particularly preferred coating compositions to be used according to the invention contain from 3 to 25% by weight, particularly preferably from 5 to 20% by weight of urethane compound C) (solid), based on the amount of water-dilutable (meth)acrylic copolymer A) (solid).

The specific preparation of the urethane compounds C) can be carried out using processes known to a person skilled in the art. It may, for example, be carried out in the presence of organic solvent or without any solvent. In the case of a preparation without solvent, at the end of the synthesis, dilution can be carried out in suitable organic solvents. By neutralising acid groups present in the urethane compounds C) and diluting with water, the urethane compounds can be converted into the aqueous phase. There may be obtained, for example, organic solutions having a solids content of 5-80% by weight or aqueous dispersions having a solids content of 35-55% by weight.

The urethane compounds C) are generally prepared by reacting the polyisocyanates or isocyanate-functional prepolymers with the monohydroxy compounds in a stoichiometric ratio. However, it is also possible first to react the polyisocyanates or isocyanate-functional prepolymers with monohydroxy compounds in an NCO:OH ratio of from 2:1 to 1.2:1 and then to increase the molecular weight by reacting the remaining NCO groups stoichiometrically with diols or polyols. Furthermore, it is possible to react first the polyisocyanates with diols or polyols by forming an isocyanate-functional prepolymer and react then with a monoalcohol as a chain stopper.

The reaction for the preparation of the urethane compounds C) is in any case to be carried out in such a way that the resultant urethane compounds C) no longer contain any hydroxyl or isocyanate groups.

The binders with functional groups containing active hydrogen A) and the polyisocyanate cross-linking agents B) are used in such proportion that the equivalent ratio of functional groups containing active hydrogen, preferably, hydroxyl groups, of binders A) to the isocyanate groups of cross-linking components B) available for the crosslinking reaction with the functional groups containing active hydrogen of binders A), can be 5:1 to 1:5, for example, preferably, 3:1 to 1:3, and in particular, preferably, 1.5:1 to 1:1.5. If reactive thinners are used, their reactive functions should be taken into account when calculating the equivalent ratio.

The coating compositions contain furthermore water and/or organic solvents. Water-based coating compositions contain, for example, 30-60% by weight of water, and possibly small amounts of organic solvents, e.g., up to 15% by weight, preferably, up to 10% by weight based on the entire coating composition.

The organic solvents are solvents conventionally used in coating techniques. These may originate from the preparation of the binders or are added separately. Examples of suitable solvents are monohydric or polyhydric alcohols, e.g., propanol, butanol, hexanol; glycol ethers or esters, for example, diethylene glycol dialkyl ether, dipropylene glycol dialkyl ether, each with C1- to C6-alkyl, ethoxypropanol, butyl glycol; glycols, for example, ethylene glycol, propylene glycol, N-methylpyrrolidone and ketones, e.g., methyl ethyl ketone, acetone, cyclohexanone; aromatic or aliphatic hydrocarbons, for example, toluene, xylene, or straight-chain or branched aliphatic C6-C12-hydrocarbons.

The coating compositions can contain pigments, fillers and/or usual coating additives. All colour and/or special effect-giving pigments of organic or inorganic type used in paints are suitable for pigments. Examples of inorganic or organic colour pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example, from aluminum or copper, interference pigments, such as, for example, aluminum coated with titanium dioxide, coated mica, graphite effect pigments and iron oxide laminae. Examples of fillers are silicon dioxide, barium sulphate, talcum, aluminium silicate and magnesium silicate.

The additives are additives usually used in the paint industry. Examples of such additives are light stabilizers, for example, based on benztriazoles and HALS (hindered amine light stabilizer) compounds, flow control agents based on (meth)acrylic homopolymers or silicon oils, rheology-influencing agents, such as, highly disperse silicic acid or polymeric urea compounds, thickeners, such as, crosslinked polycarboxylic acid or polyurethanes, anti-foaming agents, wetting agents, curing accelerators for the cross-linking reaction, for example, organic metallic salts, such as, dibutyl tin dilaurate, zinc naphthenate and compounds containing tertiary amino groups, such as, triethylamine for the cross-linking reaction of hydroxy functional binders with polyisocyanates. The additives are added in the usual amounts familiar to the person skilled in the art.

It is fundamental to the invention that the two-component coating compositions to be used in the process contain the component C). The component C) can be incorporated into the coating composition in various ways:
1. The component C) can be added in 100% form, in the form of an organic solution or in the form of an aqueous dispersion as a separate component in the preparation of the coating composition. It is preferably added as an organic solution in the case of solvent-based coating compositions and as an aqueous dispersion in the case of aqueous coating compositions.
2. The component C) can be added to the coating composition in 100% form, in the form of an organic solution or in the form of an aqueous dispersion as a constituent of the binder component B). If the component C) is added to the coating composition as a constituent of the binder component B), component C) can be added in the form of an organic solution to the solvent-based binder in the case of solvent-based coating compositions. In the case of aqueous coating compositions, urethane compounds C) containing acid groups or no acid groups can be added to the generally acid-functional binders in the organic phase prior to inversion into the aqueous phase and then be converted along with said binders into the aqueous phase. The use of ionic and nonionic emulsifiers is, at the same time or additionally, possible for inversion into the aqueous phase. The urethane compounds C) of variant 2 can be introduced into aqueous coating compositions also as an organic solution in water-dilutable binders.

Since the coating compositions are two-component systems, generally binder component A) and polyisocyanate component B) may only be mixed together shortly before application. The term "shortly before application" is well-known to a person skilled in the art. The time period within which the ready-to-use coating composition may be prepared prior to the actual use/application depends, e.g., on the pot life of the coating composition.

In principle, the coating compositions can still be adjusted to spray viscosity with water and/or organic solvents prior to application. Pigments, fillers and additives generally used for paint may be used in one and/or both components of the two-component system.

In the preparation of the finished coating composition, component C) is preferably used as a constituent of the base coat component (hydroxyl component without a crosslinking agent). In principle, however, it is possible—albeit not preferable—for the component C) to be used as a constituent of the polyisocyanate curing agent component.

The coating compositions are applied to optionally precoated substrates. Preferred substrates are vehicle bodies and vehicle body parts.

The coating compositions may be applied by conventional application methods. Examples of application methods are brushing, roller application, knife coating, dipping, but in particular spraying. After an optional flash-off phase, the coating layers may then be cured or the next coating layer is applied. Substrates which may be used are the various materials, e.g. used in vehicle construction, for example, metals, such as, iron, zinc, aluminum, magnesium, stainless steel or the alloys thereof or plastics, such as, polyurethanes, polycarbonates or polyolefins.

According to a first preferred embodiment, the coating composition containing the urethane compound C) that is used in the process according to the invention is a clear coating composition that is applied onto a pigmented colour- and/or special effect-imparting base coat layer to produce a clear coat layer.

According to a second preferred embodiment, the coating composition containing the urethane compound C) that is used in the process according to the invention is a pigmented one-layer top coat composition that is applied onto a substrate coated with one or more coating layers, for example, with a primer and/or surfacer layer, to produce a pigmented top coat layer.

Accordingly the present invention is preferably directed to a process for the production of a coating, comprising the following steps:
  1. applying a top coat layer of colour- and/or special effect-imparting base coat composition and a transparent clear coat composition or of a pigmented one-layer top coat composition onto a prior coating,
  2. curing the top coat layer applied in step I.

In step 1 of the process according to the invention a coating layer, preferably a top coat layer of a colour- and/or special effect-imparting base coat composition and a transparent clear coat composition or of a pigmented one-layer top coat composition is applied onto a prior coating. The colour- and/or special effect-imparting base coat composition contains colour pigments and/or effect pigments which are used to impart the final coating a desired colour and/or effect.

In step 2 of the process according to the invention, the applied coating layers, preferably the top coat layers are then cured, wherein each layer may be cured separately after application thereof or two or more coating layers are applied one after the other without intermediate curing and are jointly cured. The applied coating layer containing the urethane compound C) is cured under conditions such that the component C) does not contribute to the crosslinking of the applied coating composition by chemical reaction.

Preferably, the applied coating composition containing the urethane compound C) is hardened at temperatures from room temperature to 80° C.

The new process according to the invention, is suitable for industrial coatings and in particular for vehicle and vehicle part refinishing. For refinishing, curing temperatures of, for example, 20° C. to 80° C., in particular, 40 to 60° C. are used. The coating compositions can also be used for coating large vehicles and transportation vehicles, such as, trucks, busses and railroad cars, where typically curing temperatures of up to 80° C. are used. Furthermore, the process can be used for coating any industrial goods other than motor vehicles.

The coating compositions in the form of transparent clear coats can be applied, for example, using the wet-in-wet process on solvent-based or aqueous color and/or effect-giving basecoat layers. In this case, the color and/or effect-giving basecoat layer is applied to a substrate, precoated if necessary, in particular, to precoated vehicle bodies or parts thereof, prior to the application of the clear coat layer. Following a drying period, if allowed for, both layers are cured together.

The coating compositions in the form of a pigmented topcoat can be applied, for example, to normal one-component or two-component filler layers. However, the coatings can also be applied and cured as a filler layer, for example, on normal primers, for example, two-component epoxide primers.

The present invention provides a process for painting substrates which allows to apply coating composition up to coating thicknesses of, for example 60 to 70 μm without surface defects such as, for example, popping marks. This applies, in particular, if aqueous coating compositions are applied. The coating compositions may be hardened at moderate temperatures ranging from, for example, room temperature to 80° C., in particular at 60 to 80° C. The process according to the invention produces coatings which adhere very well to the substrate, in particular to the base coat on application as a clear coat, and having very good resistance to stone ship and very good visual properties such as gloss. These advantageous properties, such as adhesion, resistance to stone ship and gloss, are preserved even after exposure to moisture. Water-based two-component isocyanate-curing coating compositions which, in accordance with the invention, contain the urethane compounds C) may be applied to produce defect-free smooth coats.

The invention will be further described by reference to the following Examples. All parts and percentages are on a weight basis unless otherwise indicated. All molecular weights disclosed herein are determined by GPC (gel permeation chromatography) using a polystyrene standard.

EXAMPLES

Example 1

1.1 Preparation of a Urethane Compound C 221 parts by weight of butyl acetate and 500 parts by weight of VESTANAT® T-1890 IPDI (isophorone diisocyanate) isocyanurate supplied by Evonik Industries AG, Essen, Germany and 0.1 parts by weight of dibutyltin dilaurate were placed in a three-necked flask having a stirrer and thermometer and heated to 65° C. 13 parts by weight of ethylene glycol were added in such a way that the temperature did not exceed 100° C. The reaction mixture was kept at 100° C. until an NCO number of <13.6% had been achieved. The mixture was then cooled to 60° C. and 186 parts by weight of cylohexanol were added in portions in such a way that the temperature of 100° C. was not exceeded. The mixture was kept at 100° C. until an NCO number of <0.1% had been achieved. The mixture was then diluted with 80 parts by weight of butyl acetate. There resulted a solution having a solids content of 69.5% by weight.

1.2 Introduction of the Urethane Compound into a Water-Dilutable Binder Emulsion 482 parts by weight of an 80% solution of a (meth)acrylate polymer (composition: 29 percent by weight of glycidyl ester of versatic acid; 12.3 percent by weight of acrylic acid; 21 percent by weight of styrene; 20 percent by weight of hydroxymethyl methacrylate; 17.7 percent by weight of isobutyl methacrylate) having an acid number of 30 mg KOH/g of solid resin and a hydroxyl number of 150 mg KOH/g of solid resin in ethoxypropanol were mixed with 82 parts by weight of the urethane compound 1 in a three-necked flask at 80° C. The mixture was heated to 100 to 120° C. The solvent was removed completely by distillation under vacuum. The mixture was then cooled to 95° C. and 16 parts by weight of dimethylethanolamine were added. After homogenising for 15 minutes, 420 parts by weight of demineralised water were added. There resulted a solvent-free aqueous emulsion having a solids content of 44%.

Example 2

Preparation of a Clear Coat Composition

Firstly, the clear coat base component (1) was prepared from the following constituents:
76.40% by weight of the aqueous binder emulsion from Example 1.2,
0.28% by weight of a conventional commercial flow control agent (BYK® 345 silicone surfactant supplied by Byk-Chemie GmbH, Wesel, Germany),
0.28% by weight of a conventional commercial wetting additive (BYK® 347 silicone surfactant supplied by Byk-Chemie GmbH, Wesel, Germany),
0.28% by weight of a conventional commercial light stabiliser (TINUVIN® 292 hindered amine stabilizer supplied by BASF, Ludwigshafen, Germany),
0.55% by weight of a conventional commercial light stabiliser (TINUVIN® 1130 UV Absorber supplied by BASF, Ludwigshafen, Germany),
22.21% by weight of demineralised water.
The clear coat crosslinking agent component (2) was prepared as follows from:

53.17% by weight of a conventional commercial DESMODUR® XP2410 polyisocyanate crosslinking agent from Bayer Aktiengesellschaft, Leverkusen, Germany.
46.83% by weight of butyl glycol acetate.

The clear coat base component (1) and crosslinking agent component (2) were intensively mixed together in a 3:1 ratio by weight. The clear coat thus obtained had the following features:
Solid: 41.9%
Solvent: 12%
Water: 46.1%
NCO:OH: 1.2 (equivalent ratio)
Viscosity: 29" (DIN EN ISO 2431 with DIN 4 cup, 20° C.)
VOC: 222 g/l; 1.85 lbs/gal (VOC=volatile organic compounds)

Example 3

Comparison

Preparation of a Comparative Clear Coat Composition (without Urethane Compound C)

The clear coat base component (1) of the comparative clear coat composition was prepared from the following constituents:

76.40% by weight of a water-dilutable binder emulsion of a (meth)acrylic copolymer (44% in water). The (meth)acrylate copolymer is the copolymer of Example 1.2.

0.28% by weight of a conventional commercial flow control agent BYK® 345 silicone surfactant supplied by Byk-Chemie GmbH, Wesel, Germany, 0.28% by weight of a conventional commercial wetting additive BYK® 347 silicone surfactant supplied by Byk-Chemie GmbH, Wesel, Germany, 0.28% by weight of a conventional commercial light stabiliser TINUVIN® 292 hindered amine stabilizer supplied by BASF, Ludwigshafen, Germany, 0.55% by weight of a conventional commercial light stabiliser TINUVIN® 1130 UV Absorber supplied by BASF, Ludwigshafen, Germany, 22.21% by weight of demineralised water.

The clear coat crosslinking agent component (2) was prepared as in Example 1 and mixed with the comparative clear coat base component (1) in a base component: crosslinking agent ratio by weight of 3:1.

Example of Application

A conventional commercial one-component water-based base coat composition (Standohyd Basecoat Mix 311; Standox GmbH) was applied in a resultant dry coating thickness of approx. 13 μm to steel sheets which had been pre-coated with a conventional commercial filler. After a flash-off phase of 10 minutes at room temperature, the base coat was hardened for 20 minutes at 80° C. The clear coat composition of example 2 and the comparative clear coat composition of example 3 were then applied in two spray passes in a resultant dry coating thickness of approx. 65 μm. After a final flash-off phase of approx. 10 minutes at room temperature, the clear coat was hardened for 30 minutes at 80° C.

The coating results are set out in the following Table:

|  | Clear Coat of Example 2 | Comparative Clear Coat of Example 3 |
|---|---|---|
| Gloss, 20° C. (initial) | 91 | 88 |
| Surface defects | No popping marks | Some popping marks |
| After Dry Test: 7 d at room temperature: | | |
| Gloss: | 90 | 85 |
| Stone chip resistance: | 2 | 2-3 |
| Adhesion | 0 | 0 |
| After humidity test: 7 d room temperature + 96 h at 40° C. | | |
| Stone chip resistance: | 2 | 5 |
| Adhesion: | 0-1 | 3 |
| HPC (1 h) | 1 | 2-3 |
| Gloss (1 h): | 88 | 75 |

The results given in the Table clearly show that the use of the clear coating composition to be used in the process according to the invention results in improved gloss, stone chip resistance and adhesion, even after humidity test, compared with the use of the comparative clear coating composition (without urethane compound C) in the multilayer structure.

Test Methods:
Gloss: ISO 2813
Stone chip resistance: STD 234
Adhesion: ISO 2409
HPC: STD 4234
Humidity Test: ISO 2812-2

What we claim is:

1. Process for painting substrates comprising the following steps:
   1. Applying a coating composition to an optionally pre-coated substrate and
   2. Curing the applied coating composition,
   wherein the coating composition comprises:
   A) at least one binder having functional groups containing active hydrogen,
   B) at least one polyisocyanate cross-linking agent having free isocyanate groups and
   C) at least one urethane compound having at least two —O—CO—NH— groups, wherein the urethane compound is free from functional groups which are capable of entering into a cross-linking reaction with components A) and/or B), said urethane compound is prepared by reacting a mixture consisting essentially of i) the isocyanurate of isophorone diisocyanate; ii) cyclohexanol; and optionally iii) organic solvent.

2. The process according to claim 1, wherein the coating composition applied in step 1 is cured at temperatures from room temperature to 80° C.

3. The process according to claim 1 wherein the coating composition is a top coat layer of a colour- and/or special effect-imparting base coat composition and a transparent clear coat composition or a top coat layer of a pigmented one-layer top coat composition.

4. The process according to claim 1, wherein the coating composition contains 3-25% by weight of the urethane compound C) (solid) based on the amount of the at least one binder A) (solid).

5. The process according to claim 4, wherein the coating composition contains 5-20% by weight of the urethane compound C) (solid) based on the amount of the at least one binder A) (solid).

6. The process according to claim 1, wherein the component A) contains hydroxyfunctional (meth)acrylic copolymers.

7. The process according to claim 6, the (meth)acrylic copolymers having a number-average molecular mass of from 1,500 to 6,000, an acid number of from 5 to 35 mg KOH/g of solid resin and a hydroxyl number of from 60 to 150 mg KOH/g of solid resin.

8. The process according to claim 1, wherein the coating composition is water-based.

9. The process according to claim 1 wherein said coating composition is suitable for vehicle refinishing painting.

10. The process according to claim 1 wherein the at least one urethane compound has a number-average molecular mass Mn of from 400 to 5,000.

11. The process according to claim 1, wherein the at least one urethane compound has a number-average molecular mass Mn of from 600 to 3,000.

12. Process for painting substrates comprising the following steps:
   1. Applying a coating composition to an optionally pre-coated substrate and
   2. Curing the applied coating composition,
   wherein the coating composition comprises:
   A) at least one binder having functional groups containing active hydrogen,
   B) at least one polyisocyanate cross-linking agent having free isocyanate groups and
   C) at least one urethane compound having at least two —O—CO—NH— groups, wherein the urethane compound is prepared by reacting a mixture consisting of i) the isocyanurate of hexamethylene diisocyanate and/or the isocyanurate of isophorone diisocyanate; ii) cyclohexanol; and optionally iii) organic solvent.

13. The process according to claim 12 wherein the at least one urethane compound has a number-average molecular mass Mn of from 400 to 5,000.

14. The process according to claim 12 wherein the at least one urethane compound has a number-average molecular mass Mn of from 600 to 3,000.

15. The process according to claim 12 wherein the urethane compound is substantially free from functional groups which are capable of entering into a cross-linking reaction with components A) and/or B).

* * * * *